United States Patent [19]
Pickert et al.

[11] Patent Number: 5,212,715
[45] Date of Patent: May 18, 1993

[54] DIGITAL COMMUNICATION SIGNALLING SYSTEM

[75] Inventors: William F. Pickert, Hoffman Estates; James A. McDonald, Buffalo Grove; Thomas A. Sexton, Schaumburg; Charles J. Malek, Crystal Lake, all of Ill.

[73] Assignee: Motorola, Inc., Schaumburg, Ill.

[21] Appl. No.: 647,334

[22] Filed: Jan. 25, 1991

[51] Int. Cl.⁵ .............................................. H04L 7/00
[52] U.S. Cl. ..................................... 375/114; 370/76; 370/121; 455/127
[58] Field of Search .................. 375/114, 59; 370/112, 370/110.4, 121, 110.1, 76, 99, 105.1; 455/38, 127; 371/43, 37.1

[56] References Cited

U.S. PATENT DOCUMENTS

| | | | |
|---|---|---|---|
| 3,753,228 | 8/1973 | Nickolas et al. | 375/114 X |
| 4,636,791 | 1/1987 | Burke et al. | 340/825.52 |
| 4,692,945 | 9/1987 | Zdunek | 455/17 |
| 4,701,944 | 10/1987 | Howard et al. | 379/63 |
| 4,723,264 | 2/1988 | Sasuta et al. | 379/58 |
| 4,825,193 | 4/1989 | Siwiak et al. | 340/311.1 |
| 4,831,647 | 5/1989 | D'Avello et al. | 379/91 |
| 4,992,753 | 2/1991 | Jenson et al. | |

*Primary Examiner*—Curtis Kuntz
*Assistant Examiner*—Tesfaldet Bocure
*Attorney, Agent, or Firm*—Susan L. Lukasik; Raymond A. Jenski; Steven G. Parmelee

[57] ABSTRACT

In frequency-hopping spread-spectrum systems, it is necessary to maintain frequency and bit synchronization (sync) between the transmitter and receiver in order to maintain quality data recovery at the receiver. A protocol is described which includes a synthesizer lock field (109) to allow frequency sync, a clock sync field (123) to achieve quick clock sync, and a data sync field (125) to provide data sync. Other fields are provided in the protocol to allow both voice (141) and data (127) transmissions, inband signalling (139), and error correction (143). A method and apparatus, driven by a microprocessor (303) and ASIC (301) combination, are described that generate and transmit this protocol.

45 Claims, 4 Drawing Sheets

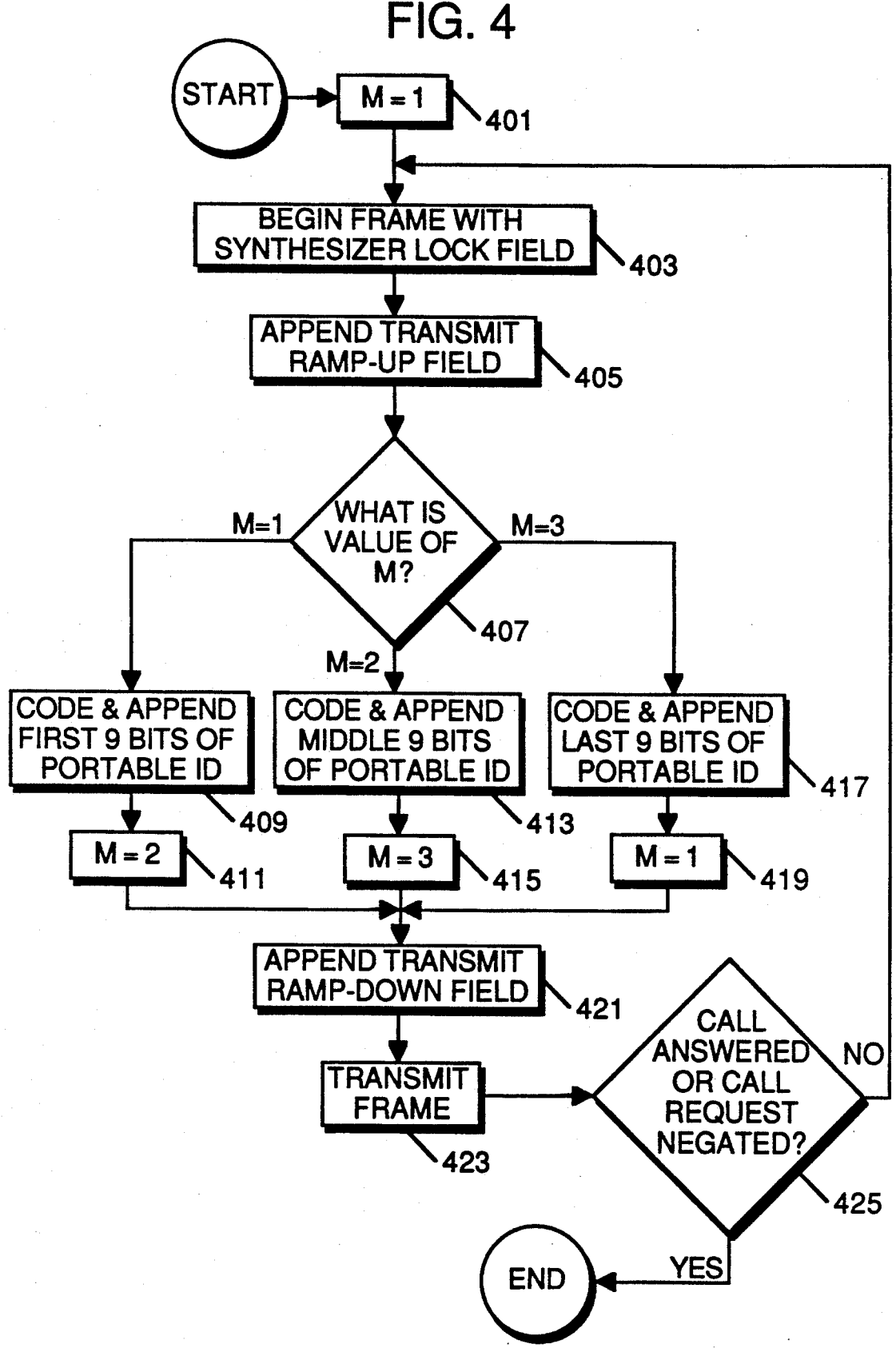

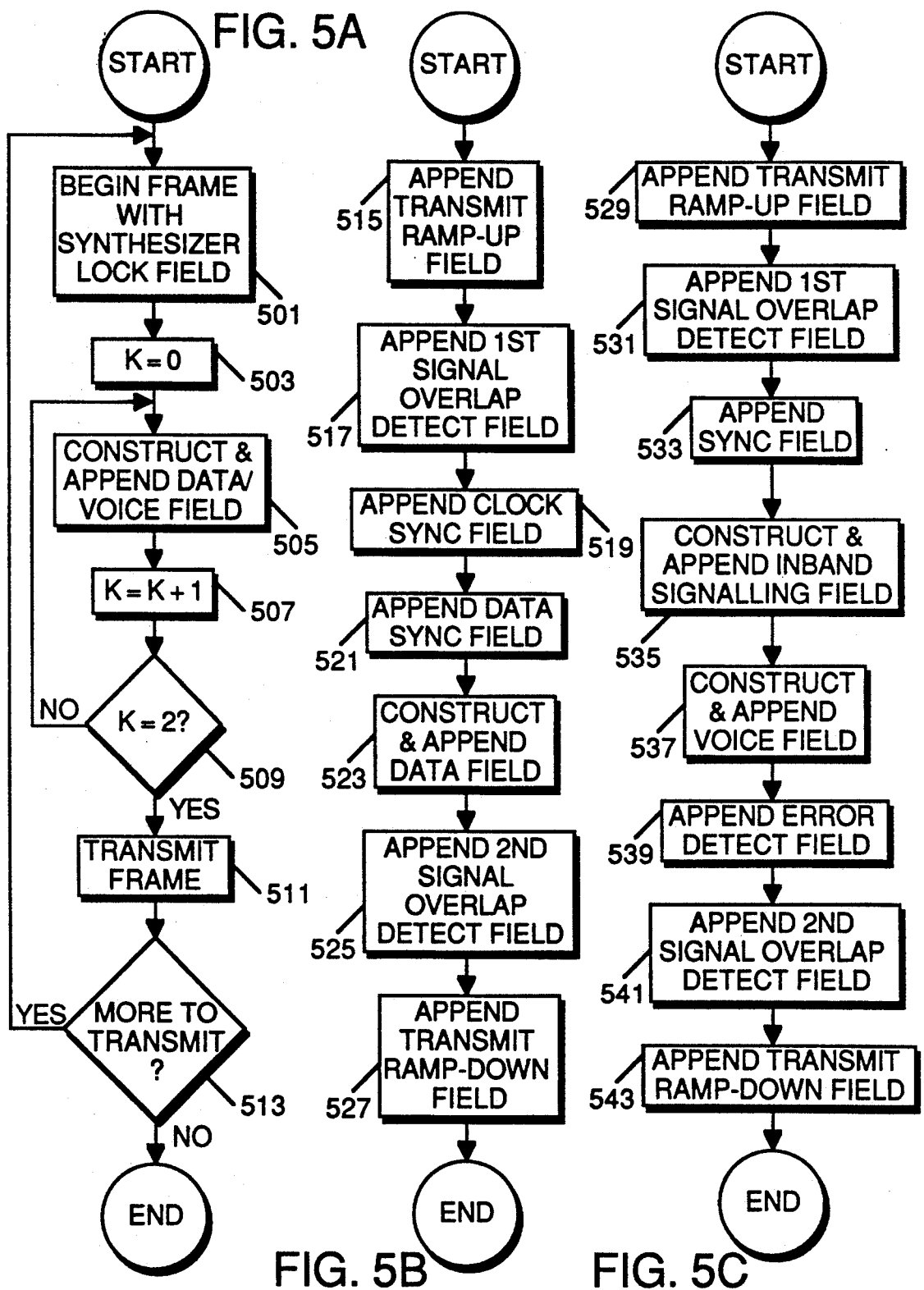

DIGITAL COMMUNICATION SIGNALLING SYSTEM

FIELD OF THE INVENTION

This invention relates to personal communication systems. More particularly, this invention relates to signalling methods and apparatus for personal communication systems.

BACKGROUND OF THE INVENTION

There is an emerging world market need for local area wireless personal communications. In many parts of the world, government agencies have allocated frequency spectrum for this type of service. In the United States, the FCC has stated that there is no spectrum that can be granted to this service on a license primary user basis. However, the FCC's position has been interpreted to say that the Industrial, Scientific, and Medical (ISM) band may be used for this purpose on a shared secondary basis, provided low-power spread-spectrum transmissions are used. Recently, the FCC issued specific rules pertaining to this type of service.

It is apparent that if one can provide a system compliant with these rules at a low cost that is resilient to the interference that might be encountered while operating in the ISM band on a secondary basis, it would service a growing need for local area communications.

In traditional radio systems, a transmission takes place by modulating the information of the transmission about a single carrier frequency. In a frequency-hopping spread-spectrum system, the radio breaks the information to be transmitted into equal periods of time, one period known as one hop time, and transmits on a different carrier frequency for each hop time in a pseudo-random order. A radio receiver then tunes to the proper frequency at the appropriate time for each hop in order to demodulate the message. This requires a communication protocol that enables the receiver to synchronize, also known as sync for short, to the transmitted signal in both frequency and time with good audio quality. Reference is made to U.S. patent application Ser. No. 07/634,368, filed on Dec. 27, 1990 on behalf of James McDonald, with the same assignee as the present invention, titled "Wireless Personal Communication System" which may contain related material.

SUMMARY OF THE INVENTION

The invention encompasses a method of transmission in a communication system from a radio transmitter that communicates digital information to a radio receiver. A message frame is generated, having a format comprising (i) a field enabling transmission carrier frequency changes and (ii) at least one field for the digital information. The at least one field for the digital information is comprised of (a) a transmitter ramp-up field, (b) a first unsynchronized signal overlap detection field, (c) a synchronization field, (d) a field containing the digital information, and (e) a second unsynchronized signal overlap detection field. The generated message frame is then transmitted.

BRIEF DESCRIPTION OF THE DRAWINGS

FIG. 4 is a flowchart showing construction of a ringing format in accordance with the invention.

FIG. 5A is a flowchart showing generation of a data/voice frame in accordance with the invention.

FIG. 5B is a flowchart showing construction of a data field in accordance with the invention.

FIG. 5C is a flowchart showing construction of a voice field in accordance with the invention.

DESCRIPTION OF A PREFERRED EMBODIMENT

The following describes a communication protocol and a method and apparatus for a communication between a personal communication unit and a fixed (base) station in a personal communication system using frequency-hopping spread-spectrum radio technology.

Figure 1A:
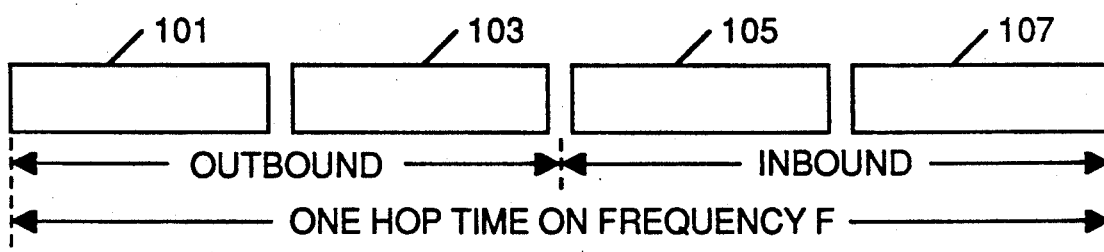
FIG. 1A is a TDM representation of a single hop in accordance with the invention.

In the preferred embodiment, the communication protocol is comprised of the bit fields shown in FIG. 1, comprised of FIG. 1A, FIG. 1B, FIG. 1C, FIG. 1D, and FIG. 1E. FIG. 1A is a TDM (Time-Division Multiplexing) representation of a single hop. Each hop time is 6.25 ms and is further time divided into four TDM slots 101, 103, 105, and 107, not including synthesizer lock time. In the preferred embodiment, the first two slots 101 and 103 are outbound slots and the last two slots 105 and 107 are inbound slots. These slots can reflect many different arrangements, such as one inbound and three outbound, depending on the nature of the call in progress or other such factors. Each slot contains control or voice and control information. See FIG. 1B for the frame structure of each hop.

Figure 1B:
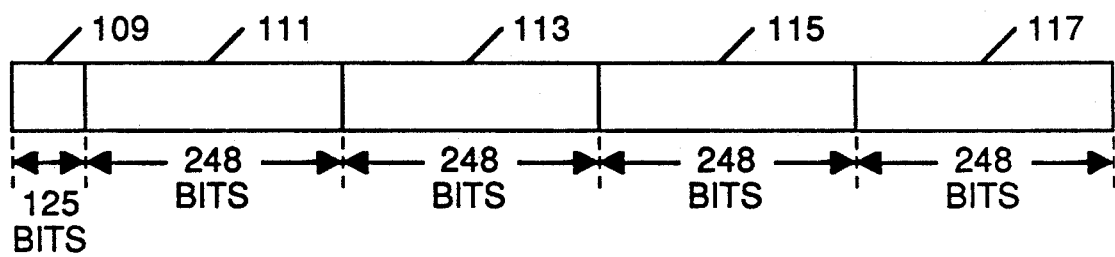
FIG. 1B shows the frame structure of a hop in accordance with the invention.

FIG. 1B shows the frame structure of a hop. Each hop frame is divided into five bit (data) fields. The data is placed in each frame at 178.75 kHz. The first bit field 109 in time is 125 bits in length and contains data to allow the synthesizer in the receiver to lock, thus enabling transmission frequency changes (hops). Each of the last four fields 111, 113, 115, and 117 is 248 bits in length. The data in field 111 corresponds to the data in slot 101, the data in field 113 corresponds to the data in slot 103, data in field 115 corresponds to the data in slot 105, and data in field 117 corresponds to the data in slot 107. The structure of each of these last four fields is dependent on the nature of the information to be sent, and three possible structures are shown FIG. 1C, FIG. 1D, and FIG. 1E.

Figure 1C:
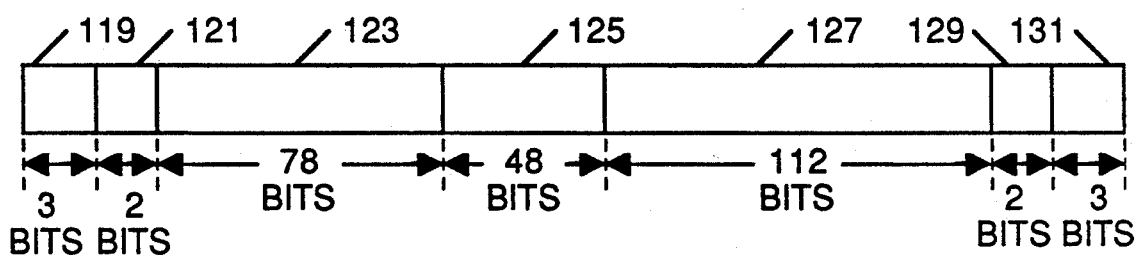
FIG. 1C is a bit field representation of a data channel format in accordance with the invention.

FIG. 1C is a bit field representation of a data channel format, also called link initialization format. It contains control data information. It is used as a data channel for the exchange of information and when the handset or fixed station needs to establish a link. The function of this format is to allow the receiver to attain bit and hop synchronization and identify the destination device. A transmit ramp-up field 119, 3 bits in length, allows time for the transmitter to reach full power. A transmit ramp-down field 131, 3 bits in length, allows time for the transmitter to power down. The second field 121 and second to last field 129 are each 2 bits in length and are used to detect overlap of unsynchronized signals. The third field 123 contains 78 binary bits of repeated 010101 pattern, providing the maximum number of data edges to synchronize the receive clock. The fourth field 125 is a data sync field, a 48-bit synchronization pattern that defines the start of valid data. This 48-bit pattern has low self-correlation and alternately appears in adjacent slots normally (non-inverted), in fields 111 and 115, and inverted, in fields 113 and 117. In the preferred embodiment, the normal pattern is (hexadecimal) 446E D3A4 F272, and the inverted pattern is BB91 2C5B 0D8D. The fifth field 127 is 112 bits in length, containing a (7,4) Hamming-coded 64-bit packet of system control data to be transmitted.

Figure 1D:
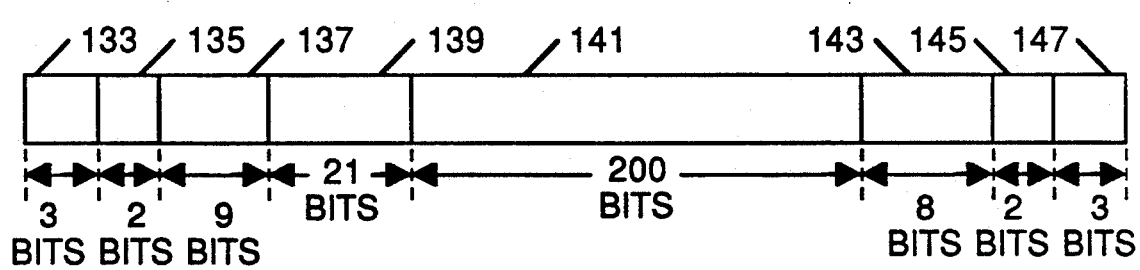
FIG. 1D is a bit field representation of a voice channel format in accordance with the invention.

FIG. 1D is a bit field representation of a voice channel format. This format is used to carry digitized voice and provide inband data signalling for RF link control. A transmit ramp-up field 133, 3 bits in length, allows time for the transmitter to reach full power. A transmit ramp-down field 147, 3 bits in length, allows time for the transmitter to power down. The second field 135 and second to last field 145 are each 2 bits in length and are used to detect overlap of unsynchronized signals. The third field 137 is 9 bits in length and contains a marker pattern to let the receiver detect frame synchronization and to correct for bit slippage. The fourth field 139, 21 bits in length, contains 12 bits of inband signalling information coded with (7,4) Hamming code. These 12 bits include 8 bits of data link layer control information and 4 bits of fast signalling channel control information. The fifth field 141 contains 200 bits of digitized voice data, thus resulting in a system with 32 kbps of voice. Higher data rates can be attained by combining two time slots; more reliable data can be obtained by using more than one time slot to send the same digitized voice. The sixth field 143 is the 8-bit check field for error detection for the digitized voice.

Figure 1E:
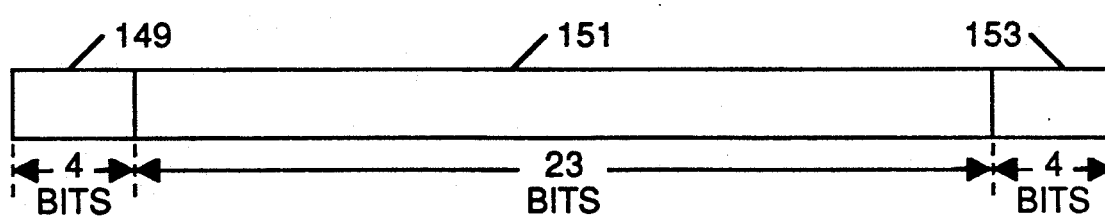
FIG. 1E is a bit field representation of a ringing format in accordance with the invention.

FIG. 1E is a bit field representation of a ringing format. The ringing format is used to ring a handset and to serve as a fixed station beacon. To fulfill these two requirements, a normal (non-inverted) and inverted format are defined. A transmit ramp-up field 149, 4-bit pattern 0101, allows time for the transmitter to reach full power. A transmit rampdown field 153, 4-bit pattern 0101, allows time for the transmitter to power down. The second field is 23 bits long and consists of 9 of the 27 bits of the personal communication unit's identification (PID) encoded in a (23,12) Golay code. The three unused high order bits are reserved for future use. On the first transmission of the ringing format, the first 9 bits of the PID are encoded, on the second transmission, the middle 9 bits of the PID are encoded, and on the third transmission, the last 9 bits of the PID are encoded. This sequence of PID transmission is repeated while the ringing format is used. The 31 bits in this format are transmitted at 22.34 kHz.

Figure 2:
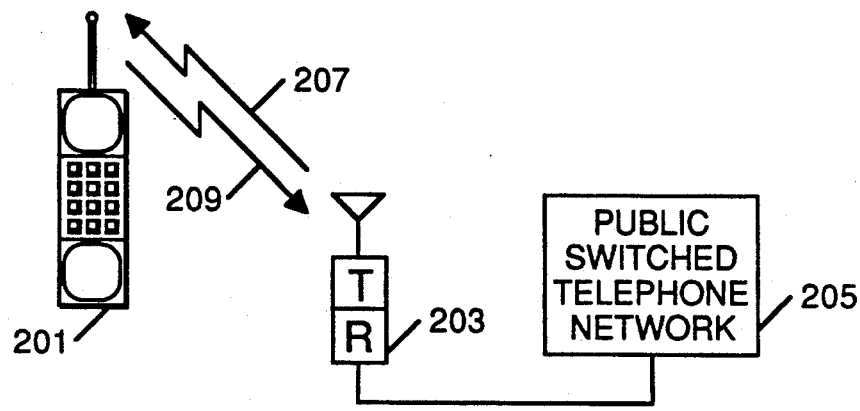
FIG. 2 is a system diagram in accordance with the invention.

FIG. 2 is a system diagram in accordance with the invention. A portable personal communication unit 201 is shown in a communication with a fixed (base) station 203 which is connected to the Public Switched Telephone Network (PSTN) 205. A communication 209 originating at the portable 201 is received by the fixed station 203. A communication 207 originating at the fixed station 203 is received by the portable 201. Information necessary to allow these communications 207 and 209 to take place is transmitted in the protocol described in FIG. 1. Both the portable 201 and fixed station 203 use frequency-hopping spread-spectrum radio technology in the ISM frequency band to transmit and receive communications.

Figure 3:
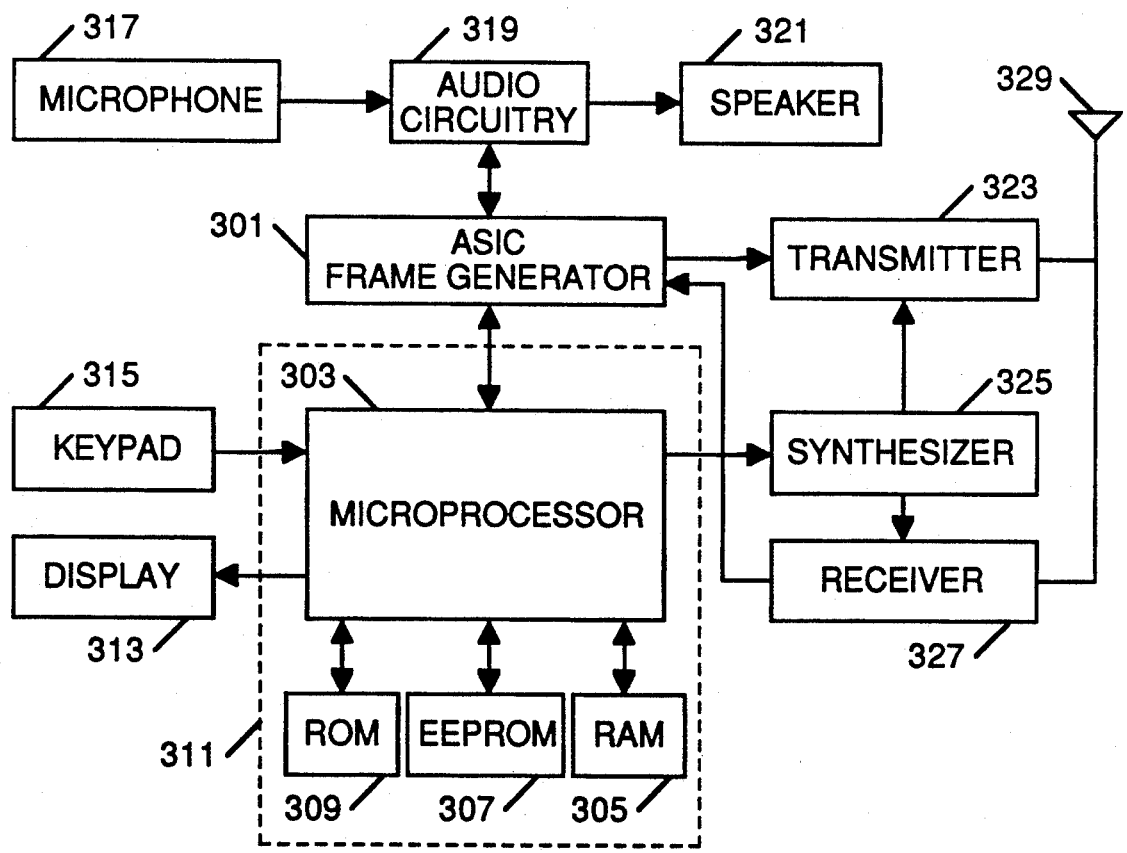
FIG. 3 is a block diagram of a personal communication unit in accordance with the invention.

FIG. 3 is a block diagram of a personal communication unit 201, such as is shown in FIG. 2. Similar hardware is used in the fixed station 203. In the preferred embodiment, an ASIC (Application Specific Integrated Circuit) 301, such as a CMOS ASIC also available from Motorola, Inc., and a microprocessor 303, such as a 68HC11 microprocessor available from Motorola, Inc., combine to generate the communication protocol shown in FIG. 1. The microprocessor 303 uses RAM 305, EEPROM 307, and ROM 309, consolidated in one package 311 in the preferred embodiment, to execute the steps necessary to generate the protocol and to perform other functions for the communication unit, such as writing to a digital display 313, accepting information from a keypad 315, and controlling a frequency synthesizer 325. The ASIC 301 processes audio transformed by the audio circuitry 319 from a microphone 317 and to a speaker 321. Certain message fields are constructed by the microprocessor 303, and others are constructed by the ASIC 301, which generates the message frame and transfers it to a transmitter 323 that transmits through an antenna 329 using carrier frequencies produced by the frequency synthesizer 325 in the hopping manner chosen for the system and directed by the microprocessor 303. Information received by the communication unit's antenna 329 enters the receiver 327 which demodulates the message frame using the carrier frequencies from the frequency synthesizer 325, in accord with the hopping manner chosen for the system. The ASIC 303 then parses the received message frame into its constituent parts.

FIG. 4 is a flowchart showing construction of a ringing format, as generated by the ASIC 301. The ringing format is transmitted until the originator of the call removes his request or until the call is answered, similar to the way a PSTN ringing signal works. In step 401, M is set to the value of 1. The ASIC 301 begins the frame with the synthesizer lock field at step 403. The transmit ramp-up field is appended at step 405. The value of M is checked at step 407. If M equals 1, the process continues with step 409, where the first 9 bits of the 27-bit PID are coded by the microprocessor 303 and appended by the ASIC 301, after which M is set to 2 at step 411. If M equals 2 at step 407, the process continues with step 413, where the middle 9 bits of the PID are coded by the microprocessor 303 and appended by the ASIC 301, after which M is set to 3 at step 415. If M equals 3 at step 407, the process continues with step 417, where the last 9 bits of the PID are coded by the microprocessor 303 and appended by the ASIC 301, after which M is set to 1 at step 419. After steps 411, 415, or 419, the process continues with step 421, where the transmit ramp-down field is appended. The frame is then transmitted at 423. In the preferred embodiment, there are two outbound slots within each frame, hence two ringing field formats can be transmitted in each frame, either two of the same frame for improved quality or two different frame. If at step 425 the call has been answered or the call request has been negated, this process is completed. If the call is answered, the process continues with step 501 in FIG. 5A. If at step 425 the is not answered and the call request has not been negated, the process continues with step 403.

FIG. 5A is a flowchart showing construction of a data/voice frame as generated by the ASIC 301 and microprocessor 303. The ASIC 301 begins the frame with the synthesizer lock field at step 501. The value of K is set to 0 in step 503. The data/voice field, either data as shown in FIG. 1C or voice as shown in FIG. 1D, is constructed and appended in step 505. See FIG. 5B for steps to append a data field and FIG. 5C for steps to append a voice field. In step 507, the value of K is increased by 1. If at step 509 K equals 2 (both outbound TDM slots are completed), the frame is considered complete and is transmitted at step 511. If at step 509 K does not equal 2, the process continues with step 505. If the microprocessor 303 determines that there is more information to transmit at step 513, the process continues with step 501, otherwise the process is done.

FIG. 5B is a flowchart showing construction of a data field if desired at process step 505. The ASIC 301 appends to the frame the transmit ramp-up field at step 515, the first signal overlap detect field at step 517, the clock sync field at step 519, and the data sync field at step 521. The microprocessor 303 then constructs the data field which is appended by the ASIC in step 523. The ASIC then appends the second signal overlap detect field at step 525 and the transmit ramp-down field at step 527.

FIG. 5C is a flowchart showing construction of a voice field if desired at process step 505. The ASIC appends to the frame the transmit ramp-up field at step 529, the first signal overlap detect field at step 531, and the sync field at step 533. The microprocessor constructs the inband signalling field which is appended by the ASIC 301 at step 535. The ASIC 301 then constructs and appends the voice field at step 537. The ASIC 301 then appends the error detect field at step 539, the second signal overlap detect field at step 541, and the transmit ramp-down field at step 543.

What is claimed is:

1. A method of transmission in a communication system from a radio transmitter that communicates digital information to a radio receiver, comprising the steps of:
   generating a message frame having a format comprising:
   (i) a field enabling carrier frequency change and
   (ii) at least one data field for the digital information, said at least one data field comprising:
   (a) a transmitter ramp-up field,
   (b) a first unsynchronized signal overlap detection field,
   (c) a synchronization field,
   (d) a field containing the digital information, and
   (e) a second unsynchronized signal overlap detection field; and
   transmitting said generated message frame.

2. The method of transmission of claim 1, wherein said at least one data field further comprises (f) a transmitter ramp-down field.

3. The method of transmission of claim 1, wherein said synchronization field comprises:
   a clock synchronization field and
   a data synchronization field.

4. The method of transmission of claim 3, wherein said clock synchronization field is comprised of a repeated binary bit pattern 010101.

5. The method of transmission of claim 3, wherein said data synchronization field is comprised of the number 446E D3A4 F272 in hexadecimal notation.

6. The method of transmission of claim 3, wherein said data synchronization field is comprised of the number BB91 2C5B 0D8D in hexadecimal notation.

7. The method of transmission of claim 3, wherein there are at least two data fields for the digital information and said synchronization field is comprised of the hexadecimal number BB91 2C5B in a first of the at least two data fields and the hexadecimal number BB91 2C5B 0D8D in a second of the at least two data fields.

8. A method of transmission in a communication system from a radio transmitter that communicates digital information to a radio receiver, comprising the steps of:
   generating a message frame having a format comprising:
   (i) a field enabling carrier frequency change and
   (ii) at least one data field for the digital information, said at least one data field comprising:
   (a) a transmitter ramp-up field,
   (b) a first unsynchronized signal overlap detection field,
   (c) a synchronization field,
   (d) an inband signalling field,
   (e) a field containing the digital information, and
   (f) a second unsynchronized signal overlap detection field; and
   transmitting said generated message frame.

9. The method of transmission of claim 8, wherein said at least one data field further comprises (g) an error detection field.

10. The method of transmission of claim 8, wherein said at least one data field further comprises (h) a transmitter ramp-down field.

11. A method of transmission in a communication system from a radio transmitter that communicates digital information to a radio receiver, comprising the steps of:
    generating a message frame having a format comprising:
    (i) a field enabling carrier frequency change and
    (ii) at least one data field for the digital information, said at least one data field comprising:
    (a) a transmitter ramp-up field and
    (b) a field containing the digital information; and
    transmitting said generated message frame.

12. The method of transmission of claim 11, wherein said at least one data field further comprises (c) a transmitter ramp-down field.

13. The method of transmission of claim 11, wherein said digital information field comprises at least two bits of a communication unit identification.

14. The method of transmission of claim 11, wherein said digital information field comprises at least two bits of a communication unit identification encoded in a (23, 12) Golay code.

15. A communication system with a radio transmitter that communicates digital information to a radio receiver, the communication system comprising:
    means for generating a message frame having a format comprising:
    (i) a field enabling carrier frequency change and
    (ii) at least one data field for the digital information, said at least one data field comprising:
    (a) a transmitter ramp-up field,
    (b) a first unsynchronized signal overlap detection field,
    (c) a synchronization field,
    (d) a field containing the digital information, and
    (e) a second unsynchronized signal overlap detection field; and
    means for transmitting said generated message frame.

16. The communication system of claim 15, wherein said at least one data field further comprises (f) a transmitter ramp-down field.

17. The communication system of claim 15, wherein said synchronization field comprises:
a clock synchronization field and a data synchronization field.

18. The communication system of claim 17, wherein said clock synchronization field is comprised of a repeated binary bit pattern 010101.

19. The communication system of claim 17, wherein said data synchronization field is comprised of the number 446E D3A4 F272 in hexadecimal notation.

20. The communication system of claim 17, wherein said data synchronization field is comprised of the number BB91 2C5B 0D8D in hexadecimal notation.

21. The communication system of claim 17, wherein there are at least two data fields for the digital information and said synchronization field is comprised of the hexadecimal number BB91 2C5B in a first of the at least two data fields and the hexadecimal number BB91 2C5B 0D8D in a second of the at least two data fields.

22. A communication system with a radio transmitter that communicates digital information to a radio receiver, the communication system comprising:
means for generating a message frame having a format comprising:
(i) a field enabling carrier frequency change and
(ii) at least one data field for the digital information, said at least one data field comprising:
(a) a transmitter ramp-up field,
(b) a first unsynchronized signal overlap detection field,
(c) a synchronization field,
(d) an inband signalling field,
(e) a field containing the digital information, and
(f) a second unsynchronized signal overlap detection field; and
means for transmitting said generated message frame.

23. The communication system of claim 22, wherein said at least one data field further comprises (g) an error detection field.

24. The communication system of claim 22, wherein said at least one data field further comprises (h) a transmitter ramp-down field.

25. A communication system with a ratio transmitter that communicates digital information to a radio receiver, the communication system comprising:
means for generating a message frame having a format comprising:
(i) a field enabling carrier frequency change and
(ii) at least one data field for the digital information, said at least one data field comprising:
(a) a transmitter ramp-up field and
(b) a field containing the digital information; and
means for transmitting said generated message frame.

26. The communication system of claim 25, wherein said at least one data field further comprises (c) a transmitter ramp-down field.

27. The communication system of claim 25, wherein said digital information field comprises at least two bits of a communication unit identification.

28. The communication system of claim 25, wherein said digital information field comprises at least two bits of a communication unit identification encoded in a (23,12) Golay code.

29. A communication unit for use in a communication system with a ratio transmitter that communicates digital information to a radio receiver, the communication unit comprising:
means for synthesizing at least one transmitter carrier frequency;
means for processing the digital information;
means, coupled to said means for processing, for generating a message frame having a format comprising:
(i) a field enabling said at least one carrier frequency to change and
(ii) at least one data field for the digital information, said at least one data field comprising:
(a) a transmitter ramp-up field,
(b) a first unsynchronized signal overlap detection field,
(c) a synchronization field,
(d) a field containing the digital information, and
(e) a second unsynchronized signal overlap detection field; and
means for transmitting said generated message frame.

30. The communication unit of claim 29, wherein said at least one transmitter carrier frequency is utilized in a frequency-hopping technique.

31. The communication unit of claim 29, wherein said at least one data field further comprises (f) a transmitter ramp-down field.

32. The communication unit of claim 29, wherein said synchronization field comprises:
a clock synchronization field and
a data synchronization field.

33. The communication unit of claim 32, wherein said clock synchronization field is comprised of a repeated binary bit pattern 010101.

34. The communication unit of claim 32, wherein said data synchronization field is comprised of the number 446E D3A4F272 in hexadecimal notation.

35. The communication unit of claim 32, wherein said data synchronization field is comprised of the number BB91 2C5B 0D8D in hexadecimal notation.

36. The communication unit of claim 32, wherein there are at least two data fields for the digital information and said synchronization field is comprised of the hexadecimal number BB91 2C5B in a first of the at least two data fields and the hexadecimal number BB91 2C5B 0D8D in a second of the at least two data fields.

37. A communication unit with a radio transmitter that communicates digital information to a radio receiver, the communication system comprising:
means for synthesizing at least one transmitter carrier frequency;
means for processing the digital information;
means, coupled to said means for processing, for generating a message frame having a format comprising:
(i) a field enabling said at least one carrier frequency to change and
(ii) at least one data field for the digital information, said at least one data field comprising:
(a) a transmitter ramp-up field,
(b) a first unsynchronized signal overlap detection field,
(c) a synchronization field,
(d) an inband signalling field,
(e) a field containing the digital information, and
(f) a second unsynchronized signal overlap detection field; and
means for transmitting said generated message frame.

38. The communication unit of claim 37, wherein said at least one transmitter carrier frequency is utilized in a frequency-hopping technique.

39. The communicaiton unit of claim 37, wherein said at least one data field further comprises (g) an error detection field.

40. The communication unit of claim 37, wherein said at least one data field further comprises (h) a transmitter ramp-down field.

41. A communication unit with a radio transmitter that communicates digital information to a radio receiver, the communication system comprising:

- means for synthesizing at least one transmitter carrier frequency;
- means for processing the digital information;
- means, coupled to said means for processing, for generating a message frame having a format comprising:
  - (i) a field enabling said at least one carrier frequency to change and
  - (ii) at least one data field for the digital information, said at least one data field comprising:
    - (a) a transmitter ramp-up field and
    - (b) a field containing the digital information; and
- means for transmitting said generated message frame.

42. The communication unit of claim 41, wherein said at least one transmitter carrier frequency is utilized in a frequency-hopping technique.

43. The communication unit of claim 41, wherein said at least one data field further comprises (c) a transmitter ramp-down field.

44. The communication unit of claim 41, wherein said digital information field comprises at least two bits of a communication unit identification.

45. The communication unit of claim 41, wherein said digital information field comprises at least two bits of a communication unit identification encoded in a (23,12) Golay code.

* * * * *

UNITED STATES PATENT AND TRADEMARK OFFICE
CERTIFICATE OF CORRECTION

PATENT NO. : 5,212,715

DATED : May 18, 1993

INVENTOR(S) : William F. Pickert et al.

It is certified that error appears in the above-identified patent and that said Letters Patent is hereby corrected as shown below:

Col. 7, line 46, "ratio" should be --radio--.

Col. 7, line 68, "ratio" should be --radio--.

Col. 8, line 36, "D3A4F272" should be --D3A4 F272--.

Signed and Sealed this

Fifteenth Day of February, 1994

Attest:

BRUCE LEHMAN

Attesting Officer

Commissioner of Patents and Trademarks